United States Patent
Li et al.

(10) Patent No.: US 9,851,755 B2
(45) Date of Patent: Dec. 26, 2017

(54) HOT SWAPPING BATTERIES IN A MOBILE DEVICE

(71) Applicant: Lenovo (Singapore) Pte. Ltd., Singapore (SG)

(72) Inventors: Scott Wentao Li, Cary, NC (US); Robert James Kapinos, Durham, NC (US); Joaquin F. Luna, Durham, NC (US); Russell SPeight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/969,718

(22) Filed: Dec. 15, 2015

(65) Prior Publication Data

US 2017/0168525 A1    Jun. 15, 2017

(51) Int. Cl.
- *H02J 7/00* (2006.01)
- *G06F 1/16* (2006.01)
- *G06F 1/18* (2006.01)
- *H01M 2/02* (2006.01)
- *H01M 2/10* (2006.01)
- *H01M 10/48* (2006.01)

(52) U.S. Cl.
CPC .......... *G06F 1/1635* (2013.01); *G06F 1/182* (2013.01); *H01M 2/0207* (2013.01); *H01M 2/0217* (2013.01); *H01M 2/1066* (2013.01); *H01M 10/48* (2013.01); *H02J 7/0045* (2013.01); *H01M 2220/30* (2013.01)

(58) Field of Classification Search
CPC .... G06F 1/1635; G06F 1/182; H01M 2/1061; H01M 10/425; H02J 7/0045
USPC .......................................... 320/107, 112, 114
See application file for complete search history.

(56) References Cited

U.S. PATENT DOCUMENTS

| | | | | |
|---|---|---|---|---|
| 4,401,350 A | * | 8/1983 | Fortune | A47B 87/02 292/128 |
| 5,507,661 A | * | 4/1996 | Honda | G06F 1/1616 439/159 |
| 5,905,632 A | * | 5/1999 | Seto | G06F 1/1616 361/679.55 |
| 5,973,477 A | * | 10/1999 | Chang | H01M 10/425 320/114 |
| 6,062,887 A | * | 5/2000 | Schuster | G06K 7/0021 439/218 |

(Continued)

*Primary Examiner* — M'Baye Diao
(74) *Attorney, Agent, or Firm* — Ference & Associates LLC (57) ABSTRACT

One embodiment provides an electronic device, including: a housing with a recess defined therein by an upper wall, a lower wall, and a planar surface between the upper wall and the lower wall, wherein the planar surface comprises a plurality of pins; said housing being open on lateral sides of said recess; and a processor disposed within the housing; a contact rail; a second contact rail; wherein the first contact rail and the second contact rail are operatively coupled to the processor; wherein the contact rail is disposed at or on a surface selected from the group of surfaces consisting of: the upper wall and the planar surface adjacent to the upper wall; and wherein the second contact rail is disposed at or on a surface selected from the group of surfaces consisting of: the lower wall and the planar surface adjacent to the lower wall. Other aspects are described and claimed.

20 Claims, 5 Drawing Sheets

(56) References Cited

U.S. PATENT DOCUMENTS

| | | | | |
|---|---|---|---|---|
| 6,362,971 | B1* | 3/2002 | Skofljanec | B60R 16/0239 |
| | | | | 280/735 |
| 6,568,860 | B2* | 5/2003 | Koch | H01R 9/2675 |
| | | | | 385/53 |
| 8,148,954 | B1* | 4/2012 | Kehlstadt | H01M 10/46 |
| | | | | 320/166 |
| 8,404,373 | B2* | 3/2013 | Dong | H01M 2/1022 |
| | | | | 429/163 |
| 8,593,108 | B2* | 11/2013 | Ferber | H02J 7/0044 |
| | | | | 320/114 |
| 9,293,858 | B2* | 3/2016 | Iikhanov | H01R 13/6215 |
| 2003/0017848 | A1* | 1/2003 | Engstrom | G06F 1/1626 |
| | | | | 455/558 |
| 2004/0014356 | A1* | 1/2004 | Hallitschke | H05K 5/0069 |
| | | | | 439/527 |
| 2005/0162497 | A1* | 7/2005 | Matsui | B41J 3/36 |
| | | | | 347/109 |
| 2007/0152630 | A1 | 7/2007 | Winkler et al. | |
| 2011/0095722 | A1* | 4/2011 | Chang | H02J 7/0055 |
| | | | | 320/107 |
| 2012/0246350 | A1* | 9/2012 | Lee | H02J 7/0008 |
| | | | | 710/16 |
| 2013/0207594 | A1* | 8/2013 | Hung | H01M 10/44 |
| | | | | 320/107 |
| 2014/0184139 | A1* | 7/2014 | Wen | H02J 7/0044 |
| | | | | 320/103 |
| 2016/0164321 | A1* | 6/2016 | Kuan | H02J 7/0004 |
| | | | | 320/114 |

* cited by examiner

HOT SWAPPING BATTERIES IN A MOBILE DEVICE

BACKGROUND

With the wide spread adoption of mobile devices (e.g., smart phones, tablets, etc.) they are becoming one of the most used methods for a user to access information or interact with the internet (e.g., conduct e-commerce, chat with friends, interact with social media, etc.). However, as screens become larger and more power intensive, and mobile devices become more relied upon for regular computer tasks, the problem of power consumption increases.

Current battery technology places stringent limits on the ability of mobile devices to last for a full day or days at a time. This is especially true for power users or users that need a large amount of processing power to complete their tasks. One solution is for a user to carry multiple batteries and simply replace the batteries as they die. However, some devices do not have removable batteries and those that do can be difficult to access. Potentially more problematic is that a user must stop whatever action they are taking, power down their device, replace the battery, and then repower the device. This can cause a delay in productivity or a loss of data.

BRIEF SUMMARY

In summary, one aspect provides an electronic device, comprising: a housing with a recess defined therein by an upper wall, a lower wall, and a planar surface between the upper wall and the lower wall; said housing being open on lateral sides of said recess; and a processor disposed within the housing; a contact rail; a second contact rail; wherein the first contact rail and the second contact rail are operatively coupled to the processor; wherein the contact rail is disposed at or on a surface selected from the group of surfaces consisting of: the upper wall and the planar surface adjacent to the upper wall; and wherein the second contact rail is disposed at or on a surface selected from the group of surfaces consisting of: the lower wall and the planar surface adjacent to the lower wall.

Another aspect provides a battery, comprising: a housing comprising a top, a bottom, and lateral edges comprising a top side, a bottom side, a right side and a left side; a plurality of contact pins located on one or more of the top and bottom; the top side of the housing comprising a substantially flat contact rail; and the bottom side of the housing comprising a substantially flat contact rail; wherein the plurality of contact pins comprise charging pins; and wherein each of the substantially flat contact rails comprise discharging rails.

A further aspect provides an electronic device, comprising: a housing with a recess defined therein by an upper wall, a lower wall, and a planar surface between the upper wall and the lower wall, wherein the planar surface comprises a plurality of pins; said housing being open on lateral sides of said recess; and a processor disposed within the housing; a contact rail; a second contact rail; wherein the first contact rail and the second contact rail are operatively coupled to the processor; wherein the contact rail is disposed at or on a surface selected from the group of surfaces consisting of: the upper wall and the planar surface adjacent to the upper wall; and wherein the second contact rail is disposed at or on a surface selected from the group of surfaces consisting of: the lower wall and the planar surface adjacent to the lower wall.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Generally, when swapping batteries on mobile devices, such as a portable gaming console, a smartphone, a tablet and a laptop, it is required to power the device down before replacing the battery. This can cause delays in work or personal activities, or complications with an application if a user has an ongoing process (e.g., a software update, etc.) taking place. This delay or interruption may also be so large a user is unable to recover from it (e.g., a deeply involved multi-player gaming session, etc.). One current solution used in many current devices is the use of a secondary power source (e.g., an additional short-term internal battery or AC power connection) which can power the device during the battery swap. However, these solutions can be costly or inconvenient to implement. Moreover, conventional structures designed for hot swapping are overly complex in terms of aligning the batteries and the device properly or tend to not faithfully maintain power during the hot swapping procedure. Thus, a solution is needed which can allow a user to hot swap batteries more easily without an internal or secondary power source and without complex securing or aligning structures.

This technical issue presents problems for a user when they are in the middle of an action or process, but need to replace the battery. Thus, a much more convenient scenario would be a hot swappable system which would allow a user to replace the current battery with a new or fully charged battery, while not requiring the device to be powered down, to be plugged in, or to have an additional temporary or short term internal battery. Further, the hot swapping mechanism should be user friendly inasmuch as easy alignment of the battery with the device is facilitated, and additionally the hot swapping mechanism should be reliable inasmuch as the battery and device contact should be easily maintained during the hot swapping procedure.

Accordingly, in one embodiment, a battery compartment comprises a recess within the information handling device to allow a depleted battery to slide out of one side and a fresh battery to slide in from the other. This allows the combination of the depleted and fresh batteries to maintain a constant power connection to the device during swap. In order to achieve this, an embodiment may have plus/minus terminal contacts running the entire length of the battery compartment, e.g., along an upper wall and along a lower wall of the recess in the housing. Additionally, the battery may have plus/minus terminal contacts running the entire length of the battery (e.g., at the top and at the bottom of the battery), whereby power is discharged in response to contact with the rails of the device housing.

An embodiment comprises a diode circuit which only allows one way current flow to the device via the rails. This diode circuit serves as an inrush current protection system when multiple batteries are paralleled during the hot swapping action.

An embodiment may have battery communication and charging pins placed in the center of the battery so that when a fresh battery is properly seated, the pins are properly seated, e.g., in a predetermined order allowing for a device connection, or are available for an accessory to be attached. A latching mechanism may also be implemented in an embodiment to allow the battery to be locked in place. This latching mechanism can be implemented on the battery's outer surface, which allows the battery to be attached to an additional accessory (e.g., a kickstand, flash light, etc.).

The illustrated example embodiments will be best understood by reference to the figures. The following description is intended only by way of example, and simply illustrates certain example embodiments.

Figure 1:
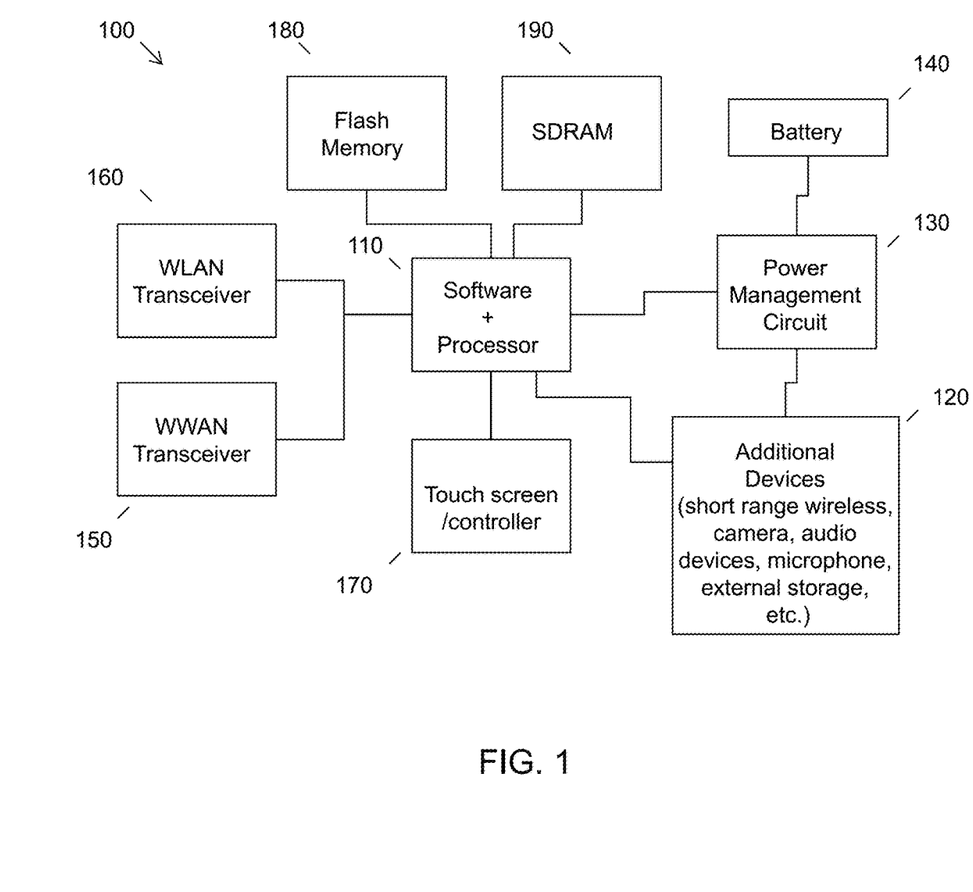
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included. System 100 often includes a touch screen 170 for data input and display/rendering. System 100 also typically includes various memory devices, for example flash memory 180 and SDRAM 190.

Figure 2:
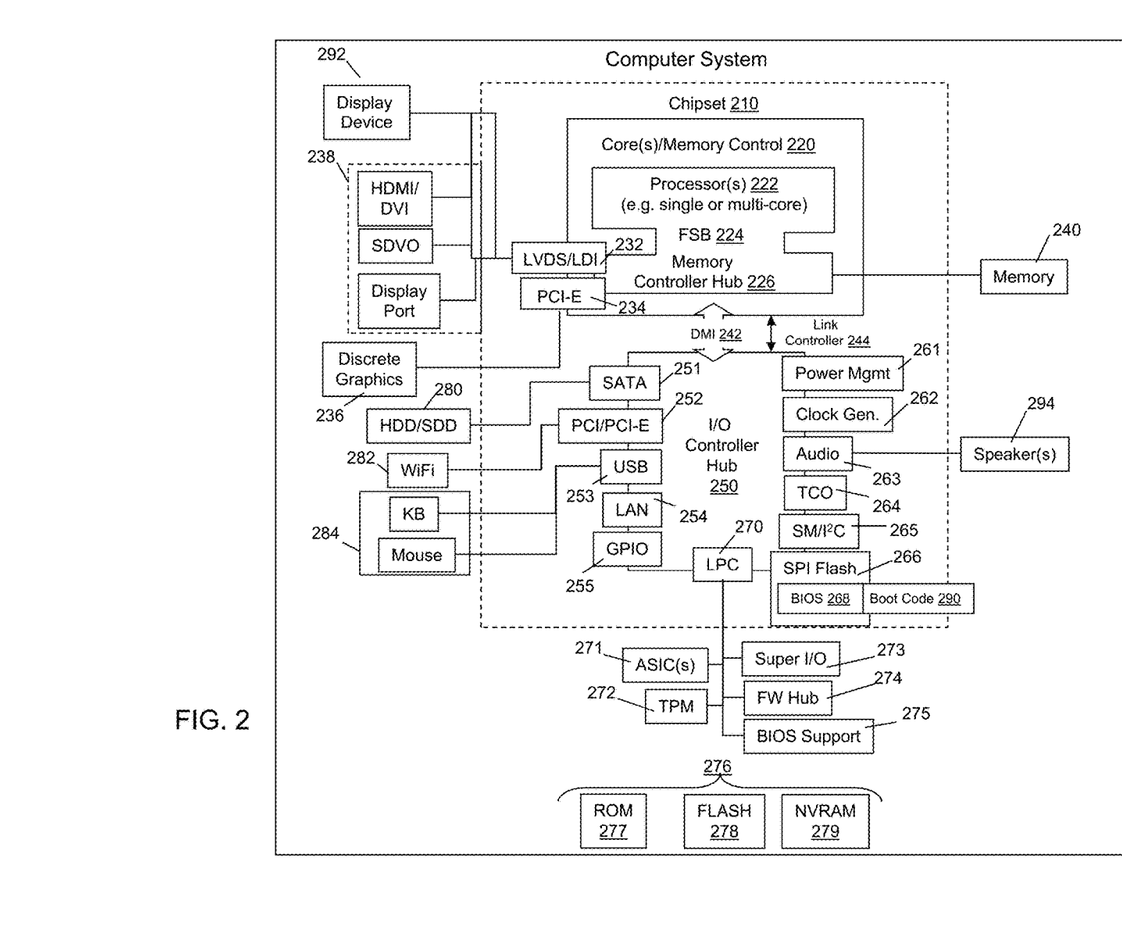
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices that users may be utilizing or maintaining while a battery replacement is needed. For example, the circuitry outlined in FIG. 1 may be implemented in a tablet or smart phone embodiment, whereas the circuitry outlined in FIG. 2 may be implemented in a personal computer embodiment.

Figure 3:
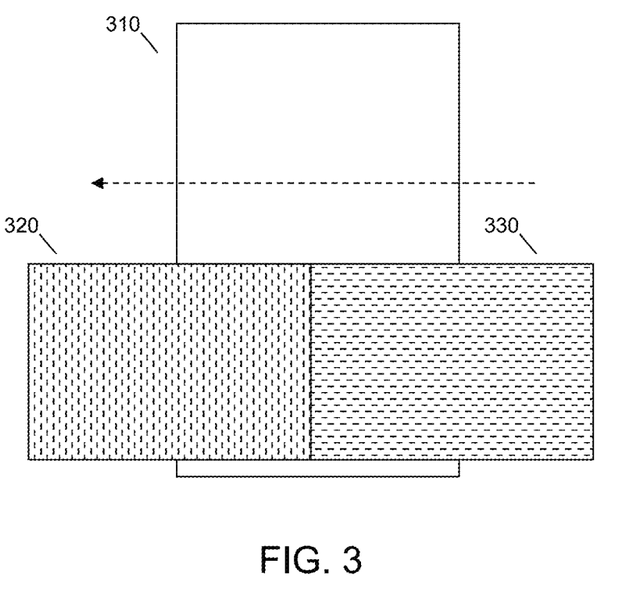
FIG. 3 illustrates an example of hot swapping batteries in a mobile device.

Referring now to FIG. 3, an embodiment of a system is illustrated that has a first battery 320 and a second battery 330 sliding through the recess of the housing of an electronic device 310. In an embodiment, the first and second batteries are of similar or identical shape, thus allowing the second battery to easily replace the first in a fluid motion. In an embodiment, a user would apply pressure to the outermost side (e.g., the right side) of the second battery 330, which in turn pushes the first battery 320 out of the recess within the electronic device 310, as indicated by the directional arrow.

In order for the first 320 and second battery 330 to simultaneously make a connection with the electronic device 310, they may, in an embodiment, have a set of contact rails. As will be appreciated by one skilled in the art, a battery may take many shapes and/or forms. However, for simplicity purposes, reference will now be made to FIGS. 4A, 4B, and 4C, which show a non-limiting example of a rectangular battery 400 with a top 410, bottom 420, top side 430, bottom side 440, left side 450, and right side 460.

Figures 4A, 4B:
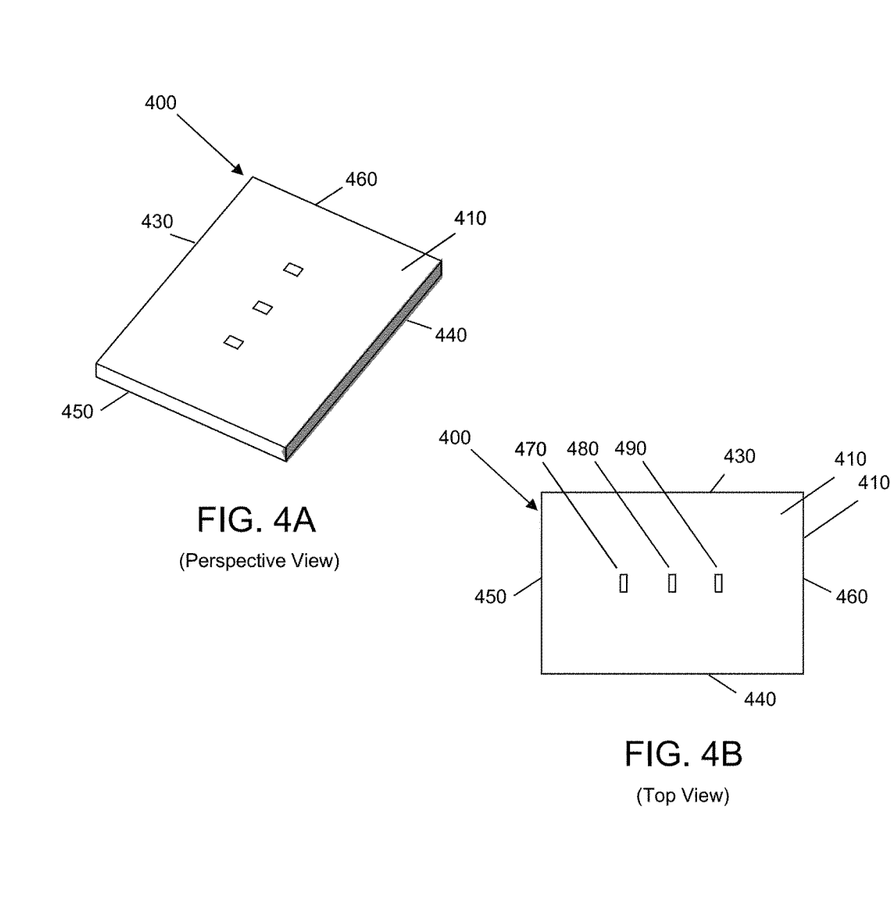
FIG. 4A illustrates a perspective view of an example battery.
FIG. 4B illustrates a top view of an example battery.

In an embodiment, the battery 400 may have a contact rail or rails (e.g., an electrically conducting surface that runs the length of the battery) along one or more sides of the battery 400, such as shown by shading of the bottom side 440 in FIG. 4A. For example, an embodiment may have a contact rail that runs along the top 430 and bottom 440 sides. Additionally or alternatively, a contact rail or rails may be disposed on the bottom 420 of the battery 400, e.g., near or adjacent to the top 430 and bottom 440 sides, such as shown by the shading in FIG. 4C. The contact rail or rails may be located on any area of the battery; however, in an embodiment the contact rails are located near the edges or sides of the battery 400.

Figure 4C:
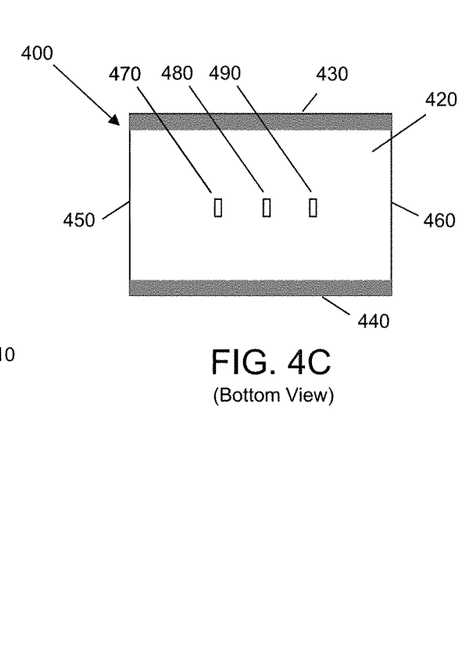
FIG. 4C illustrates a bottom view of an example battery.

In an embodiment, contact pin(s) 470, 480, and 490 may be located on the top 410 and/or bottom 420 of the battery, such as shown in FIGS. 4B and 4C. The contact pins shown in FIG. 4C are located on the bottom of the battery, and may come into contact with an additional set of pins located on the device, e.g., within the recess of the device, such as that shown in FIGS. 5A and 5B. Additionally or alternatively, the contact pins 470, 480, and 490 such as those shown in FIG. 4B may be exposed once the battery is in placed within the device. This allows the contact pins 470, 480, and 490 to be accessed during normal operation of the device.

The contact pins 470, 480, and 490 may be used for a variety of purposes. For example, in one embodiment, one or more of the contact pins 470, 480, and 490 may be utilized as charging pins (e.g., 470 as a "+" terminal and 490 as a "−" terminal). This allows for the battery 400 to be directly charged, e.g., placed in a charging dock. Moreover, the battery 400 may be charged in the mobile device 310, e.g., by using one or ore of the contact pins 470, 480, and 490 to charge the battery 400 and using the contact rails(s) to discharge the battery 400. Typically, batteries must be charged via the information handling device itself using an adapter that plugs into the device itself. However, because an embodiment has a plurality of contact pins 470, 480, and 490, the battery 400 may charge while both being used within the device and when not in the device.

A communication pin may be present within the set of contact pins 470, 480, and 490. For example, the contact pin at 480 may be a communication pin which transfers data, e.g., according to an I2C protocol, etc. The data being transmitted via the communication pin may be any type of data communication. For example, the center contact pin 480 may transfer data relating to battery conditions, such as: battery temperature, battery capacity, battery charge, and power connection status (i.e., if the device or battery is connected to alternating current (AC) power), etc. The device 310, e.g., mobile phone, may receive data passed through or from the battery 400 (e.g., using the set of contact pins 470, 480, and 490 to communicate directly with a mobile device). In order to achieve this, an embodiment may use the conductor rails to communicate with the device 310 or use an additional terminal (e.g., a second set of pins on the bottom of the battery 420 and connected to the device).

In addition to charging the battery 400, the set of contact pins 470, 480, and 490 may also perform another function. For example, in one embodiment, the set of contact pins 470, 480, and 490 may be used to power an accessory. The accessory may be a snap on accessory (e.g., attached to the battery 400 or device) or a stand-alone accessory that utilizes an adaptor to attach to the contact pins 470, 480, and 490.

In an embodiment, the edges of the battery 400 (e.g., 450 and 460) may contain a rail or snap system that allows an accessory to attach directly to the battery 400. For example, a flashlight accessory may snap directly to the battery 400 and utilize the set of contact pins 470, 480, and 490 to power the flashlight. A user might attach a protective case around the device 310. The protective case may have additional attributes such as: a light for utility or decoration (e.g., a protective case with accent lighting), a Wi-Fi hot-spot, a speaker system, and the like. By way of further example, a short range wireless speaker may be attached to the device 310 and draw power from the contact pin set 470, 480, and 490. Then, using short range wireless to communicate with the device 310, the speaker system may play music or audio sent from the device 310.

Additionally or alternatively, the accessory may be a non-powered device. For example, a kick-stand accessory may be attached directly to the battery 400 and thereby allow the device 310 to stand up for easier viewing. As a further example, the battery 400 may have a protective outer layer, which can snap directly into the battery and thus provide protection for the set of contact pins 470, 480, and 490 when not in use.

Figure 5A:
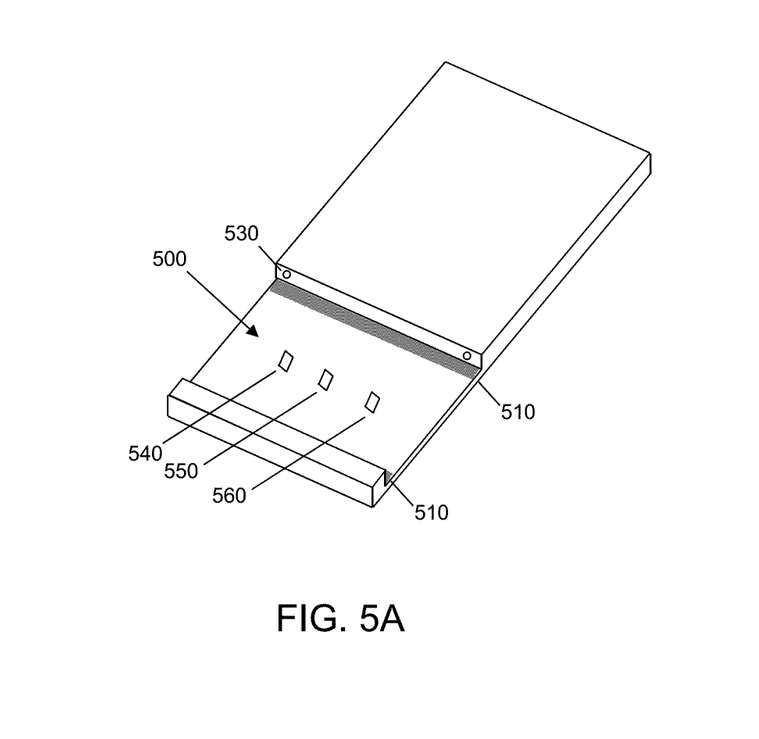
FIG. 5A illustrates an example device with a recess.
Figure 5B:
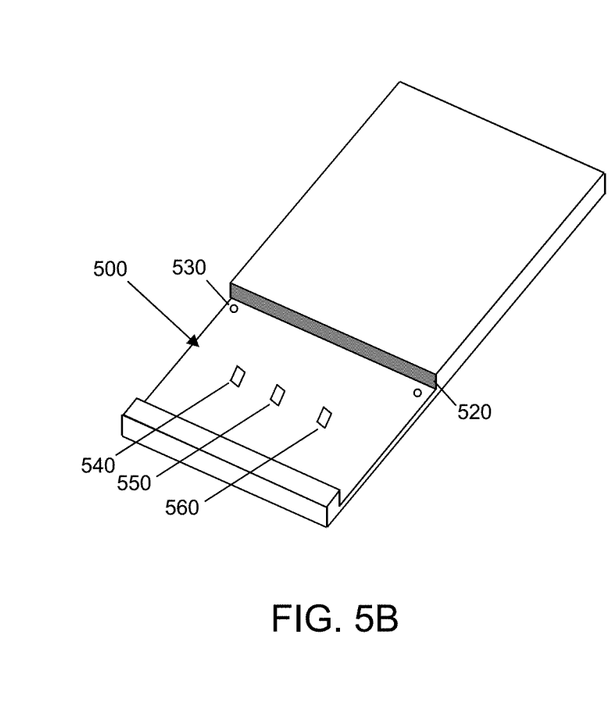
FIG. 5B illustrates another example device with recess.

Referring now to FIGS. 5(A and B), in an embodiment, an electronic device, (e.g., mobile device) such as a smart phone, tablet, and the like comprises a recess 500. The recess is of sufficient size to receive a battery, such as battery 400 shown in FIGS. 4A, 4B, and 4C. In one embodiment, the recess 500 is open on the left and right side to allow for the battery(s) to easily slide in and out of the device housing. As shown in FIG. 3, device 310, allows batteries 320 and 330 to enter and exit through the left and right side of the recess 500, respectively.

As discussed herein, a battery may have a contact rail at various locations. Similarly, the electronic device can also have contact rails at various locations. For example, in one embodiment, the device may have a contact rail 510 on or adjacent to the lower wall of the recess 500. Additionally or alternatively, a contact rail 520 may be on the upper wall of the recess 500.

In addition to the contact rails, an embodiment may also have a set of contact pins at 540, 550, 560. Similarly to the discussion herein relating to the battery contact pins, in one embodiment, one or more of the contact pins 540, 550, and 560 may be utilized as charging pins (e.g., 540 as a "+" terminal and 560 as a "−" terminal). This allows for the battery to be charged via the mobile device Additionally, a communication pin may be present within the set of contact pins 540, 550, 560. For example, the contact pin at 550 may be a communication pin, which transfers data. The data being transmitted via the communication pin may be any type of data communication. For example, the center contact pin 550 may transfer data relating to battery conditions, such as: battery temperature, battery capacity, battery charge, and power connection status (i.e., if the device or battery is connected to alternating current (AC) power), etc. The information handling device may receive data passed through or from the battery (e.g., using the set of contact pins 540, 550, and 560 to communicate directly with a mobile device). In order to achieve this, an embodiment may use the conductor rails to communicate with the information handling device, or an additional terminal (e.g., a second set of pins) may be located, e.g., on the bottom of the battery 420 and connect to the device.

In an embodiment, the information handling device may have a locking or securing mechanism to secure a battery in place once fully inserted. For example, the recess 500 may have a cavity at 530, which receives a pin or element of or attached to the battery (once the battery is fully inserted into the device). An embodiment may locate the cavity(s) 530 in various places, such as, for example the wall of the recess 500 or the planar surface of the recess 500, as shown in FIGS. 5A and 5B at 530, respectively.

Accordingly, as illustrated by the example embodiments and figures, an embodiment provides a system for replacing a depleted battery with a new charged battery without interrupting device usage. This is achieved using various technical improvements, such as a set of pins to allow for easier charging, or attachment of an accessory device. Additionally, a locking mechanism is used to secure the newly inserted battery during use of a mobile device.

The various embodiments described herein thus represent a technical improvement to replacing a first battery with a plurality of contact rails and a plurality of contact pins with a second battery which also has a plurality of contact rails and a plurality of contact pins. The batteries are used to power an electronic device which contains the batteries within its housing. The housing has a recess to receive the batteries comprising an upper wall, a lower wall, a planar surface, and a locking or securing mechanism.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic device, comprising:
   a housing with a recess defined therein by an upper wall, a lower wall, and a planar surface between the upper wall and the lower wall;
   said housing being open on lateral sides of said recess;
   a processor disposed within the housing;
   a locking mechanism located at the planar surface and securing a battery in the recess when operated;
   a first contact rail; and
   a second contact rail;
   wherein the first contact rail and the second contact rail are operatively coupled to the processor;
   wherein the first contact rail is disposed at or on a surface selected from the group of surfaces consisting of: the upper wall and the planar surface adjacent to the upper wall; and
   wherein the second contact rail is disposed at or on a surface selected from the group of surfaces consisting of: the lower wall and the planar surface adjacent to the lower wall.

2. The electronic device of claim 1, wherein the planar surface comprises a plurality of pins.

3. The electronic device of claim 2, wherein the plurality of pins comprise a positive charging terminal and a negative charging terminal.

4. The electronic device of claim 2, wherein the plurality of pins comprise a communication pin.

5. The electronic device of claim 4, wherein the communication pin transfers data relating to at least one battery condition.

6. The electronic device of claim 1, wherein the locking mechanism is located on the upper wall.

7. The electronic device of claim 1, wherein the locking mechanism is located on the lower wall.

8. A battery, comprising:
   a housing comprising a top, a bottom, and lateral edges, the lateral edges comprising a top side, a bottom side, a right side and a left side;
   a plurality of contact pins located on one or more of the top and bottom;
   the top side comprising a substantially flat contact rail; and
   the bottom side comprising a substantially flat contact rail;
   wherein the plurality of contact pins comprise charging pins; and
   wherein each of the substantially flat contact rails comprise discharging rails.

9. The battery of claim 8, wherein the plurality of contact pins includes a positive charging terminal and a negative terminal.

10. The battery of claim 8, wherein the plurality of contact pins includes a communication pin.

11. The battery of claim 10, wherein the communication pin transfers data relating to a battery condition.

12. The battery of claim 9, further comprising an accessory.

13. The battery of claim 12, wherein the accessory is at least one of: a kickstand, a flashlight, a case, and a speaker.

14. The battery of claim 9, wherein the battery is a high capacity battery.

15. The battery of claim 9, further comprising a locking mechanism securing the battery in a recess when operated.

16. The battery of claim 15, wherein the locking mechanism is located on one or more of the top side and the bottom side of the battery.

17. The battery of claim 15 wherein the locking mechanism is located on the bottom of the battery.

18. An electronic device, comprising:
   a housing with a recess defined therein by an upper wall, a lower wall, and a planar surface between the upper wall and the lower wall, wherein the planar surface comprises a plurality of pins;
   said housing being open on lateral sides of said recess;
   a processor disposed within the housing;
   a locking mechanism located at the planar surface and securing a battery in the recess when operated;
   a first contact rail; and
   a second contact rail;
   wherein the first contact rail and the second contact rail are operatively coupled to the processor;
   wherein the first contact rail is disposed at or on a surface selected from the group of surfaces consisting of: the upper wall and the planar surface adjacent to the upper wall; and
   wherein the second contact rail is disposed at or on a surface selected from the group of surfaces consisting of: the lower wall and the planar surface adjacent to the lower wall.

19. The electronic device of claim 18, wherein the plurality of pins comprise a positive charging terminal, a communication pin, and a negative charging terminal.

20. The electronic device of claim 19, wherein the communication pin transfers data relating to at least one battery condition.

* * * * *